US009111547B2

(12) United States Patent
Loui et al.

(10) Patent No.: US 9,111,547 B2
(45) Date of Patent: Aug. 18, 2015

(54) AUDIO SIGNAL SEMANTIC CONCEPT CLASSIFICATION METHOD

(75) Inventors: Alexander C. Loui, Penfield, NY (US); Wei Jiang, Fairport, NY (US); Kevin Michael Gobeyn, Rochester, NY (US); Charles Parker, Corvallis, OR (US)

(73) Assignee: KODAK ALARIS INC., Rochester, NY (US)

( * ) Notice: Subject to any disclaimer, the term of this patent is extended or adjusted under 35 U.S.C. 154(b) by 286 days.

(21) Appl. No.: 13/591,489

(22) Filed: Aug. 22, 2012

(65) Prior Publication Data

US 2014/0056432 A1 Feb. 27, 2014

(51) Int. Cl.
*G06F 15/18* (2006.01)
*G10L 25/51* (2013.01)

(52) U.S. Cl.
CPC .................................... *G10L 25/51* (2013.01)

(58) Field of Classification Search
USPC .......................................................... 706/12
See application file for complete search history.

(56) References Cited

U.S. PATENT DOCUMENTS 4,912,767 A 3/1990 Chang
7,050,971 B1 5/2006 Kaufholz
8,010,354 B2 8/2011 Otsuka et al.
8,238,615 B2 * 8/2012 Cerosaletti et al. ........... 382/112
8,285,085 B2 * 10/2012 Manico et al. ................ 382/325
8,311,364 B2 * 11/2012 Cerosaletti et al. ........... 382/286
8,330,826 B2 * 12/2012 Cerosaletti et al. ........ 348/222.1
8,611,677 B2 * 12/2013 Das et al. ...................... 382/225
8,612,441 B2 * 12/2013 Wood et al. ................... 707/736
8,699,852 B2 * 4/2014 Jiang et al. .................... 386/241
8,793,717 B2 * 7/2014 Lee ................................ 725/18
8,867,891 B2 * 10/2014 Jiang et al. .................... 386/241
8,880,444 B2 * 11/2014 Loui et al. ...................... 706/12
8,913,835 B2 * 12/2014 Kumar et al. ................. 382/197
8,976,299 B2 * 3/2015 Kumar et al. ................. 348/700

(Continued)

FOREIGN PATENT DOCUMENTS

WO 9801956 1/1998

OTHER PUBLICATIONS

Topic Tracking Across Broadcast News Videos with Visual Duplicates and Semantic Concepts, Hsu, W.H. ; Chang, S. Image Processing, 2006 IEEE International Conference on DOI: 10.1109/ICIP.2006.312379 Publication Year: 2006 , pp. 141-144.*

(Continued)

*Primary Examiner* — Michael B Holmes
(74) *Attorney, Agent, or Firm* — Hogan Lovells US LLP

(57) ABSTRACT

A method for determining a semantic concept associated with an audio signal captured using an audio sensor. A data processor is used to automatically analyze the audio signal using a plurality of semantic concept detectors to determine corresponding preliminary semantic concept detection values, each semantic concept detector being adapted to detect a particular semantic concept. The preliminary semantic concept detection values are analyzed using a joint likelihood model based on predetermined pair-wise likelihoods that particular pairs of semantic concepts co-occur to determine updated semantic concept detection values. One or more semantic concepts are determined based on the updated semantic concept detection values. The semantic concept detectors and the joint likelihood model are trained together with a joint training process using training audio signals, at least some of which are known to be associated with a plurality of semantic concepts.

13 Claims, 7 Drawing Sheets

(56) References Cited

U.S. PATENT DOCUMENTS 8,982,958 B2 * 3/2015 Kumar et al. ............ 375/240.18
8,989,503 B2 * 3/2015 Kumar et al. ................. 382/197

OTHER PUBLICATIONS

Extracting semantics from audio-visual content: the final frontier in multimedia retrieval, Naphade, M.R. ; Huang, T.S. Neural Networks, IEEE Transactions on vol. 13 , Issue: 4 DOI: 10.1109/TNN.2002.1021881 Publication Year: 2002 , pp. 793-810.*

Appscio: A Software Environment for Semantic Multimedia Analysis, Friedland, G. ; Hensley, E. ; Jain, R. ; Schumacher, J. Semantic Computing, 2008 IEEE International Conference on DOI: 10.1109/ICSC.2008.56 Publication Year: 2008 , pp. 456-459.*

Real time complex event detection for resource-limited multimedia sensor networks, Al Machot, F. ; Kyamakya, K.; Dieber, B.; Rinner, B. Advanced Video and Signal-Based Surveillance (AVSS), 2011 8th IEEE International Conference on DOI: 10.1109/AVSS.2011.6027378 Publication Year: 2011 , pp. 468-473.*

Guo et al., "Content-based audio classification and retrieval by support vector machines," IEEE Transactions on Neural Networks, vol. 14, pp. 209-215 (2003).

Tzanetakis et al., "Musical genre classification of audio signals," IEEE Transactions on Speech and Audio Processing, vol. 10, pp. 293-302 (2002).

Chang et al., "Large-scale multimodal semantic concept detection for consumer video," Proc. International Workshop on Multimedia Information Retrieval, pp. 255-264 (2007).

Giannakopoulos et al, "Violence content classification using audio features," Proc. 4th Helenic Conference on Artificial Intelligence, pp. 502-507 (2006).

Mermelstein, "Distance measures for speech recognition—psychological and instrumental," Joint Workshop on Pattern Recognition and Artificial Intelligence, pp. 91-103 (1976).

Kindermann et al., "Markov Random Fields and Their Applications," American Mathematical Society, Providence, RI, pp. 1-23 (1980).

R. Vilalta et al., "Using meta-learning to support data mining," International Journal of Computer Science and Applications, vol. 1, pp. 31-45 (2004).

Atrey et al., "Audio Based Event Detection for Multimedia Surveillance," Proc. IEEE International Conference on Acoustics, Speech and Signal Processing, vol. 5, pp. V-813-V-816 (2006).

Valenzise et al., "Scream and gunshot detection and localization for audio-surveillance systems," Proc. IEEE Conference on Advanced Video and Signal Based Surveillance, pp. 21-26 (2007).

Eronen et al., "Audio-based context recognition," IEEE Trans. on Audio, Speech, and Language Processing, vol. 14, pp. 321-329 (2006).

Clarkson et al., "Extracting context from environmental audio," Proc. Second International Symposium on Wearable Computers, pp. 154-155 (1998).

Abu-El-Quran, "Security monitoring using microphone arrays and audio classification," IEEE Transactions on Instrumentation and Measurement, vol. 55, pp. 1025-1032 (2006).

* cited by examiner

AUDIO SIGNAL SEMANTIC CONCEPT CLASSIFICATION METHOD

CROSS-REFERENCE TO RELATED APPLICATIONS

Reference is made to commonly assigned, co-pending U.S. patent application Ser. No. 13/591,472, entitled: "Audio based control of equipment and systems," by Loui et al., which is incorporated herein by reference.

FIELD OF THE INVENTION

This invention pertains to the field of audio classification, and more particularly to a method for using the relationship between pairs of audio concepts to enhance semantic classification.

BACKGROUND OF THE INVENTION

The general problem of automatic audio classification has been actively studied in the literature. For example, Guo et al., in the article "Content-based audio classification and retrieval by support vector machines" (IEEE Transactions on Neural Networks, Vol. 14, pp. 209-215, 2003), have proposed a method for classifying audio signals using a set of trained support vector machines with a binary tree recognition strategy. However, most previous work has been directed toward analyzing recordings of sounds with little background interference or device variance, and do not perform well in the presence of background noise.

Other research, such as the work described by Tzanetakis et al. in the article "Musical genre classification of audio signals" (IEEE Transactions on Speech and Audio Processing, Vol. 10, pp. 293-302, 2002), has been restricted to music genre classification. The approaches developed for classifying music are generally not well-suited or robust for use with more general types of audio signals, particularly with audio signals including a mixture of different sounds in the presence of background noise.

For multimedia surveillance, some methods have been developed to identify individual audio events. For example, the work of Valenzise et al., in the article "Scream and gunshot detection and localization for audio surveillance systems" (IEEE Conference on Advanced Video and Signal Based Surveillance, 2007), uses a microphone array to locate the identified audio scream and gunshot. Atrey et al., in the article "Audio based event detection for multimedia surveillance" (IEEE International Conference on Acoustics, Speech and Signal Processing, 2006), disclose a method for hierarchically classifying audio events. Eronen et al., in the article "Audio-based context recognition" (IEEE Trans. On Audio, Speech and Language Processing, 2006), describe a method for classifying the context or environment of an audio device. Whether these methods use single or multiple microphones, they are adapted to identify individual audio events independently. That is, each audio event is independently detected from the background noise. In the case where there are multiple audio events of interest occurring together, the performance of these methods will suffer.

Chang et al., in the article "Large-scale multimodal semantic concept detection for consumer video" (Proc. International Workshop on Multimedia Information Retrieval, pp. 255-264, 2007), describe a method for detecting semantic concepts in video clips using both audio and visual signals.

There remains a need for an audio-based classification method that is more reliable and more efficient for general types of audio signals where there can be mixed sounds from multiple sound sources with severe background noises.

SUMMARY OF THE INVENTION

The present invention represents a method for determining a semantic concept associated with an audio signal captured using an audio sensor, comprising:

receiving the audio signal from the audio sensor;

using a data processor to automatically analyze the audio signal using a plurality of semantic concept detectors to determine corresponding preliminary semantic concept detection values, the semantic concept detectors being associated with a corresponding plurality of semantic concepts, each semantic concept detector being adapted to detect a particular semantic concept;

using a data processor to automatically analyze the preliminary semantic concept detection values using a joint likelihood model to determine updated semantic concept detection values; wherein the joint likelihood model determines the updated semantic concept detection values based on predetermined pair-wise likelihoods that particular pairs of semantic concepts co-occur;

identifying one or more semantic concept associated with the audio signal based on the updated semantic concept detection values; and storing an indication of the identified semantic concepts in a processor-accessible memory;

wherein the semantic concept detectors and the joint likelihood model are trained together with a joint training process using training audio signals, at least some of which are known to be associated with a plurality of semantic concepts.

This invention has the advantage that it provides a more reliable method for analyzing an audio signal to determine a semantic concept classification relative to methods that do not incorporate a joint likelihood model.

It has the additional advantage that it performs well in environments where there are mixed sounds from multiple sound sources and in the presence of background noises.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
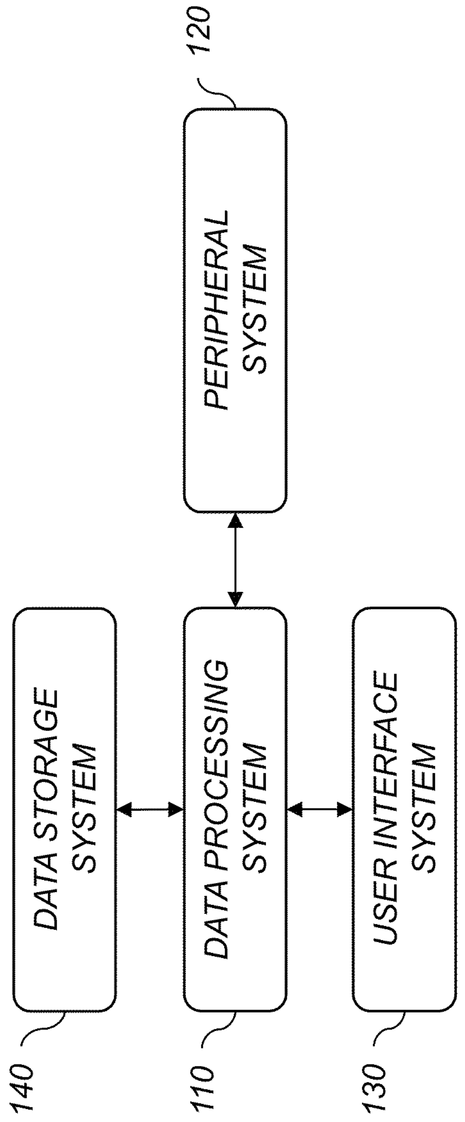
FIG. 1 is a high-level diagram showing the components of a system for determining a semantic concept classification for an audio clip according to an embodiment of the present invention.

FIG. 1 is a high-level diagram showing the components of a system for determining a semantic concept classification of an audio signal according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Figure 2:
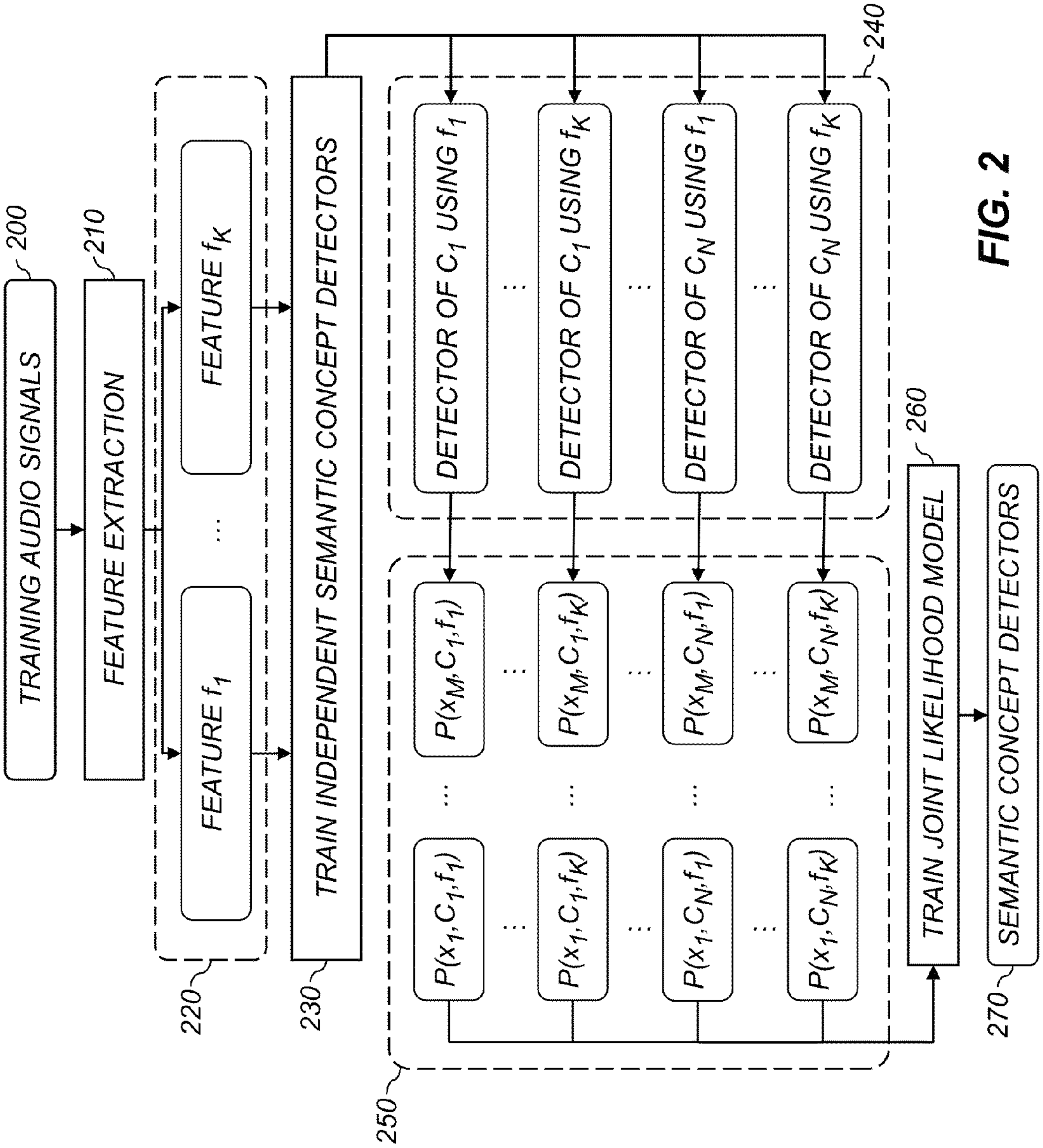
FIG. 2 is a flow diagram illustrating a method for training semantic concept detectors in accordance with the present invention.

The present invention will now be described with reference to FIGS. 2-7. FIG. 2 is a high-level flow diagram illustrating a preferred embodiment of a training process for determining a set of semantic concept detectors 270 in accordance with the present invention.

Given a set of training audio signals 200, a feature extraction module 210 is used to automatically analyze the training audio signals 200 to generate a set of audio features 220. Let $f_1, \ldots, f_K$ denote K types of audio features. The feature extraction module 210 can use any method known in the art to extract any appropriate type of audio features 220.

The audio features 220 can include various frame-level audio features determined for short time segments of the audio signal (i.e., "audio frames"). For example, in some embodiments the audio features 220 can include spectral summary features, such as the spectral flux and the zero-crossing rate features, as described by Giannakopoulos et al. in the article "Violence content classification using audio features" (Proc. 4th Helenic Conference on Artificial Intelligence, pp. 502-507, 2006), which is incorporated herein by reference. Likewise, in some embodiments, the audio features 220 can include the mel-frequency cepstrum coefficients (MFCC) features described by Mermelstein in the article "Distance measures for speech recognition—psychological and instrumental" (Joint Workshop on Pattern Recognition and Artificial Intelligence, pp. 91-103, 1976), which is incorporated herein by reference. The audio features 220 can also include short-time Fourier transform (STFT) features determined for a series of audio frames. Such features can be determined using a process that includes summing the total energy in specified frequency ranges across the frequency spectrum.

In some embodiments, clip-level features can be formed by aggregating a plurality of frame-level features. For example, the audio features 220 can further include bag-of-features representations where frame-level audio features, such as the spectral summary features, the MFCC, and the STFT-based features, are aggregated together to generate clip-level features. For example, the frame-level audio features from the training audio signals 200 can be grouped into different clusters through clustering methods, and each cluster can be treated as an audio codeword. Then the frame-level audio features from a particular training audio signal 200 can be matched against the audio codewords to compute codeword-based features for the training audio signal 200. Any clustering method can be used to generate the audio codewords, such as K-means clustering or Gaussian mixture modeling. Any type of similarities can be computed between the audio codewords and the frame-level audio features. Any type of aggregation can be used to generate codeword-based clip-level features from the similarities, such as average or weighted sum.

Next, the extracted audio features 220 for each of the training audio signals 200 are used by a train independent semantic concept detectors module 230 to generate a set of independent concept detectors 240, where each concept detector 240 is used for detecting one semantic concept using one type of audio feature 220. Let $C_1, \ldots, C_N$ denote N semantic concepts. Examples of typical semantic concepts would include Applause, Baby, Crowd, Parade Drums, Laughter, Music, Singing, Speech, Water and Wind. Each of the concept detectors 240 is adapted to determine preliminary semantic concept detection value 250 for an audio clip for a particular semantic concept ($C_j$) responsive to a particular audio feature 220 ($f_k$). In a preferred embodiment, the concept detectors 240 are well-known Support Vector Machine (SVM) classifiers or decision tree classifiers. Methods for training SVM classifiers or decision tree classifiers are well-known in the image and video analysis art.

When the audio features 220 are frame-level features, the corresponding concept detector 240 will generate frame level probabilities for each audio frame which can be aggregated to determine a clip-level preliminary semantic concept detection values 250. For example, if a particular audio feature 220 ($f_k$) is an MFCC feature, then the corresponding MFCC features for each of the audio frames can be processed through the concept detector 240 to provide frame-level semantic concept detection values. The frame-level semantic concept detection values can be combined using an appropriate statistical operation to determine a single preliminary semantic concept detection value 250 for the entire audio clip. Examples of statistical operations that can be used to combine the frame-level semantic concept detection values would include computing an average of the frame-level semantic concept detection values or finding a maximum value of the frame-level semantic concept detection values.

During a training process, the concept detectors 240 are applied to the extracted audio features 220 to determine a set of preliminary semantic concept detection values 250 ($P(x_i, C_j, f_k)$) for each of the training audio signals 200, one preliminary semantic concept detection value for each training audio signal 200 ($x_i$) from each concept detector 240 for each concept ($C_j$) corresponding to each audio feature 220 ($f_k$). These preliminary semantic concept detection values 250 are used by a train joint likelihood model module 260 to generate the final semantic concept detectors 270. Additional details regarding the operation of the train joint likelihood model module 260 will be discussed later with respect to FIG. 4.

Figure 3:
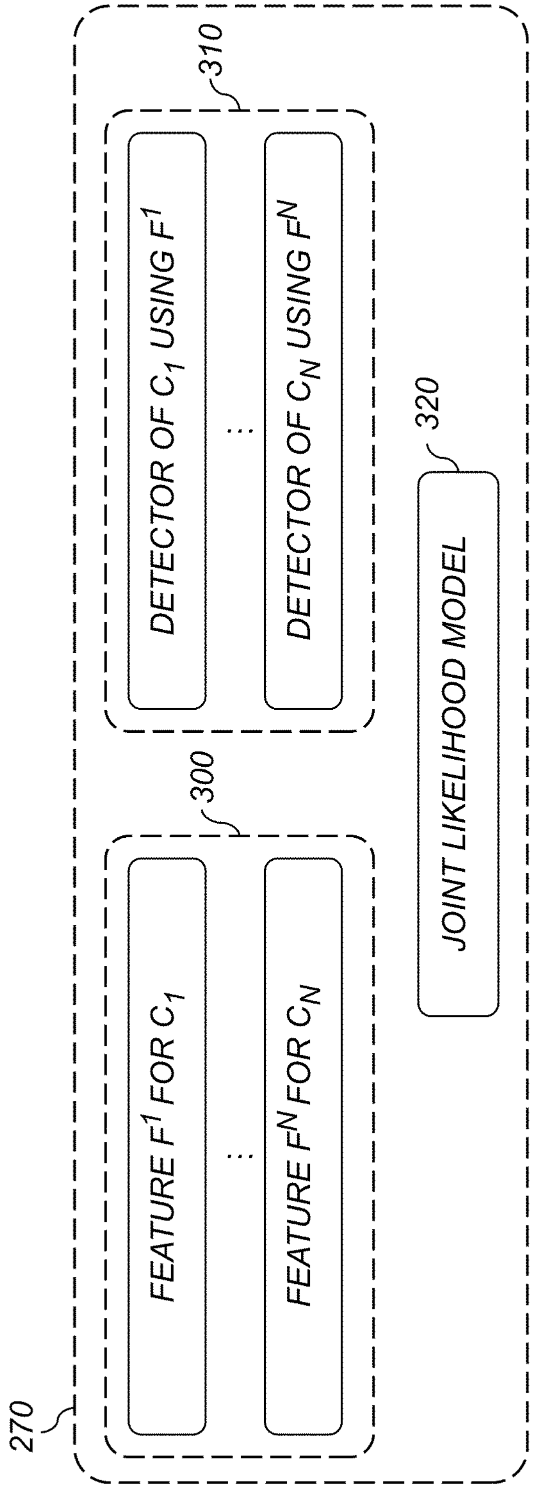
FIG. 3 shows additional details of the semantic concept detectors determined using the method of FIG. 2.

FIG. 3 illustrates the form of the semantic concept detectors 270 according to a preferred embodiment. The semantic concept detectors 270 include a set of individual semantic concept detectors 310, one for detecting each semantic concept $C_j$, together with a corresponding set of features 300, one feature $F^j$ for each semantic concept $C_j$ that is used by the corresponding semantic concept detector 310. The semantic concept detectors 270 also include a joint likelihood model 320. In a preferred embodiment, the joint likelihood model 320 is a fully-connected Markov Random Field (MRF), such as that described by Kindermann et al. in "Markov Random Fields and Their Applications" (American Mathematical Society, Providence, R.I., pp. 1-23, 1980), which is incorporated herein by reference. The joint likelihood model 320 will be described in more detail later.

Additional details for a preferred embodiment of the train joint likelihood model module 260 in FIG. 2 are now discussed with reference to FIG. 4. Let {X,Y} denote the set of training audio signals 200 ($X=\{x_i\}$) from FIG. 2, together with an associated set of corresponding training labels 415 ($Y=\{y_i\}$). The training label 415 ($y_i$) corresponding to a particular training audio signal 200 ($x_i$) includes a set of N labels $y_{i,1}, \ldots, y_{i,N}$, where each label $y_{i,j}$ indicates whether or not a semantic concept $C_j$ applies to the corresponding training audio signal 200. In a preferred embodiment, the labels $y_{i,j}$ are binary values where a value of "1" indicates that the semantic concept applies, and a value of "0" indicates that the semantic concept does not apply. In some cases, multiple semantic concepts can be applied to a particular training audio signal 200.

A filtering process 400 is applied to the preliminary semantic concept detection values 250 to filter out any of the preliminary semantic concept detection values 250 that have extremely low probabilities (e.g., preliminary semantic concept detection values 250 that are below a predefined threshold 405), thereby providing a set of filtered semantic concept detection values 410. Typically, most semantic concepts for a given training audio signal 200 will have extremely low probabilities of occurrence, and after filtering, only preliminary semantic concept detection values 250 for a few semantic concepts will remain. Let $S=\{S_{i,j,k}\}$ denote the set of filtered semantic concept detection values 410. Each item $S_{i,j,k}$ represents the preliminary semantic concept detection value of a particular training audio signal 200 ($x_i$) corresponding to concept $C_j$ determined using feature $f_k$.

Training sets 420 are defined based on the filtered semantic concept detection values 410 and the associated training labels 415. In a preferred embodiment, a threshold $t_{j,k}$ is defined for each concept $C_j$ corresponding to each feature $f_k$. In some embodiments, the thresholds can be set to fixed values (e.g., $t_{j,k}=0.5$). In other embodiments, the thresholds can be determined empirically based on the distributions of the semantic concept detection values. A term $L_{i,j,k}$ can be defined where:

$$L_{i,j,k}=\begin{cases}1; & S_{i,j,k}>t_{j,k}\\ 0; & \text{otherwise}\end{cases} \quad (1)$$

For each pair of two concepts $C_a$ and $C_b$, a training set 420 $\{X_{a,b,c,d}, Z_{a,b}\}$ can be generated responsive to features $f_c$ and $f_d$, where the feature $f_c$ is used for concept $C_a$ and the feature $f_d$ is used for concept $C_b$. In a preferred embodiment, $X_{a,b,c,d}=\{x_i: L_{i,a,c}=1 \text{ and } L_{i,b,d}=1\}$. That is, $X_{a,b,c,d}$ contains those training audio signals 200 ($x_i$) that have both $L_{i,a,c}=1$ and $L_{i,b,d}=1$. Each training audio signal 200 in the training set 420 ($x_i \in X_{a,b,c,d}$) is assigned a corresponding label $z_i$ that can take one of the following four values:

$$z_i=\begin{cases}0; & \text{if } y_{i,a}=0 \text{ and } y_{i,b}=0\\ 1; & \text{if } y_{i,a}=0 \text{ and } y_{i,b}=1\\ 2; & \text{if } y_{i,a}=1 \text{ and } y_{i,b}=0\\ 3; & \text{if } y_{i,a}=1 \text{ and } y_{i,b}=1\end{cases} \quad (2)$$

The resulting training set 420 includes the training audio signals $X_{a,b,c,d}$ associated with pairs of semantic concepts ($C_a$ and $C_b$) and the corresponding set of training labels $Z_{a,b}=\{z_i: L_{i,a,c}=1 \text{ and } L_{i,b,d}=1\}$.

In a preferred embodiment, joint likelihood model 320 is a fully-connected Markov Random Field (MRF), where each node in the MRF is a semantic concept that remains after the filtering process, and each edge in the MRF represents a pair-wise potential function between semantic concepts. For each pair of semantic concepts $C_a$ and $C_b$, using the corresponding training set 420 $\{X_{a,b,c,d}, Z_{a,b}\}$ that is responsive to features $f_c$ and $f_d$, a set of V learning algorithms 430 ($H_v(X_{a,b,c,d}, Z_{a,b})$, v=1, . . . , V) can be trained. In a preferred embodiment, each of the learning algorithms 430 is a Support Vector Machine (SVM) classifier or a decision tree classifier.

A performance assessment function 435 is defined which takes in the training set 420 $\{X_{a,b,c,d}, Z_{a,b}\}$, and the learning algorithms 430 $H_v(X_{a,b,c,d}, Z_{a,b})$. The performance assessment function 435 $(M(X_{a,b,c,d}, Z_{a,b}, H_v(X_{a,b,c,d}, Z_{a,b})))$ assesses the performance of a particular learning algorithm 430 $H_v(X_{a,b,c,d}, Z_{a,b})$ on the training set 420 $\{X_{a,b,c,d}, Z_{a,b}\}$. The performance assessment function 435 can use any method to assess the probable performance of the learning algorithms 430. For example, in one embodiment the well-known cross-validation technique is used. In another embodiment, a meta-learning algorithm described by R. Vilalta et al. in the article "Using meta-learning to support data mining" (International Journal of Computer Science and Applications, Vol. 1, pp. 31-45, 2004) is used.

The performance assessment function 435 is used to select a set of selected learning algorithms 440. One selected learning algorithm 440 ($H^*(X_{a,b,F^a,F^b}, Z_{a,b})$) is selected for each pair of concepts $C_a$ and $C_b$:

$$H^*(X_{a,b,F^a,F^b},Z_{a,b})=\text{argmax}_{v=1,\ldots,V;c,d=1,\ldots,K}[M(X_{a,b,c,d},Z_{a,b},H_v(X_{a,b,c,d},Z_{a,b}))] \quad (3)$$

Given the selected learning algorithms 440, the corresponding set of features 300 is defined, one feature $F^j$ for each semantic concept $C_j$, together with a corresponding set of individual semantic concept detectors 310, one for detecting each semantic concept $C_j$ using the corresponding determined feature $F^j$. The selected learning algorithms 440 compute the probability $p^*(z_i=j)$, j=0, 1, 2, 3, for each datum $x_i$ in $X_{a,b,F^a,F^b}$, corresponding to features $F^a$ and $F^b$. Based on the selected learning algorithms 440, a pair-wise potential function 450 ($\Psi_{a,b}$) of the joint likelihood model 320 can be defined as:

$$\Psi_{a,b}(C_a=0,C_b=0;x_i)=p^*(z_i=0)$$

$$\Psi_{a,b}(C_a=0,C_b=1;x_i)=p^*(z_i=1)$$

$$\Psi_{a,b}(C_a=1,C_b=0;x_i)=p^*(z_i=2)$$

$$\Psi_{a,b}(C_a=1,C_b=1;x_i)=p^*(z_i=3) \quad (4)$$

The joint likelihood model 320 provides information about the pair-wise likelihoods that particular pairs of semantic concepts co-occur.

Note that in some cases there is not enough data to train a good selected learning algorithm 440 for some pair of concepts $C_a$ and $C_b$. In such a case, the pair-wise potential function 450 can be simply defined as:

$$\Psi_{a,b}(C_a=0,C_b=0;x_i)=0.25$$

$$\Psi_{a,b}(C_a=0,C_b=1;x_i)=0.25$$

$$\Psi_{a,b}(C_a=1,C_b=0;x_i)=0.25$$

$$\Psi_{a,b}(C_a=1,C_b=1;x_i)=0.25$$

Figure 4:
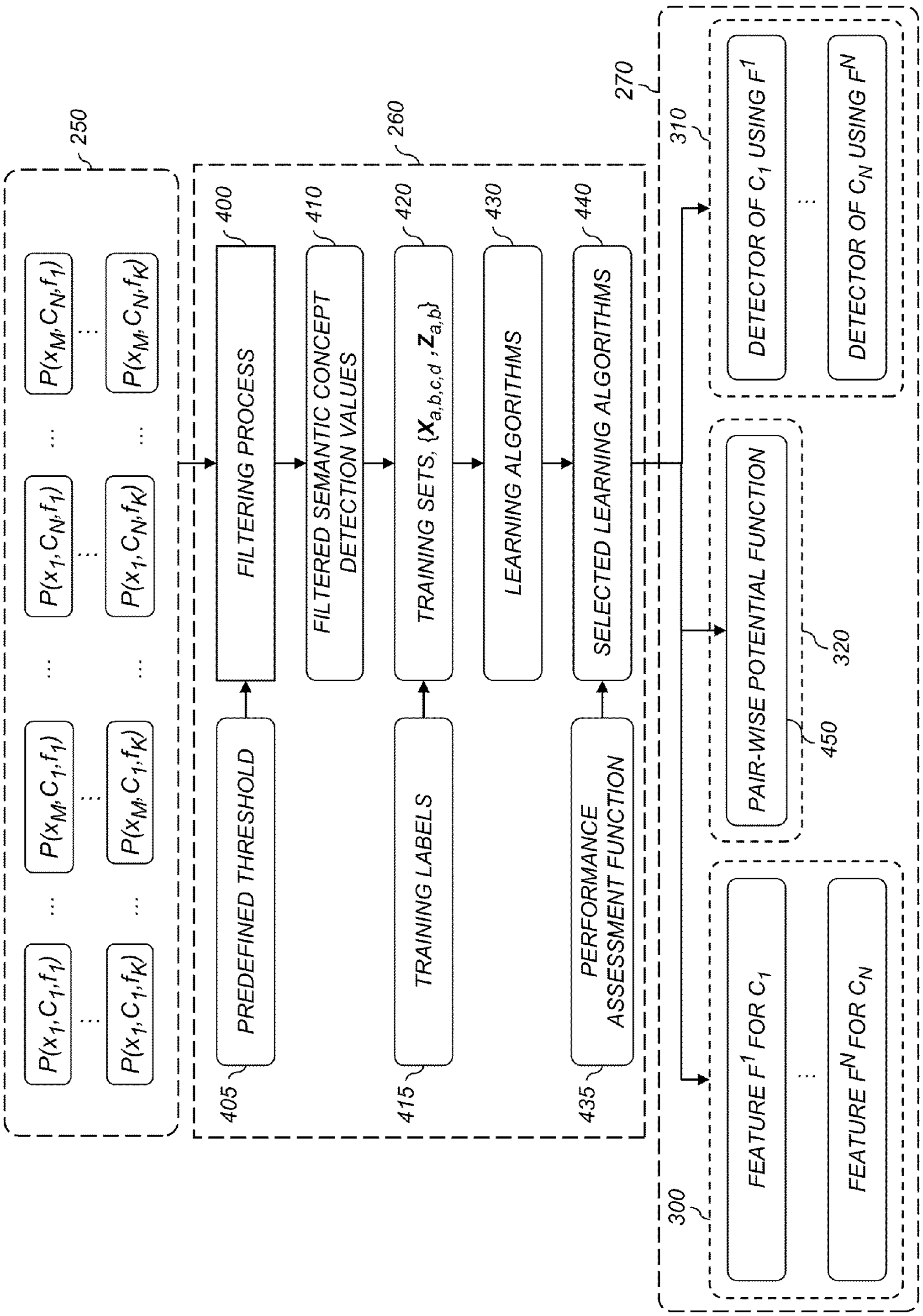
FIG. 4 shows additional details of the train joint likelihood model module in FIG. 2 according to a preferred embodiment.
Figure 5:
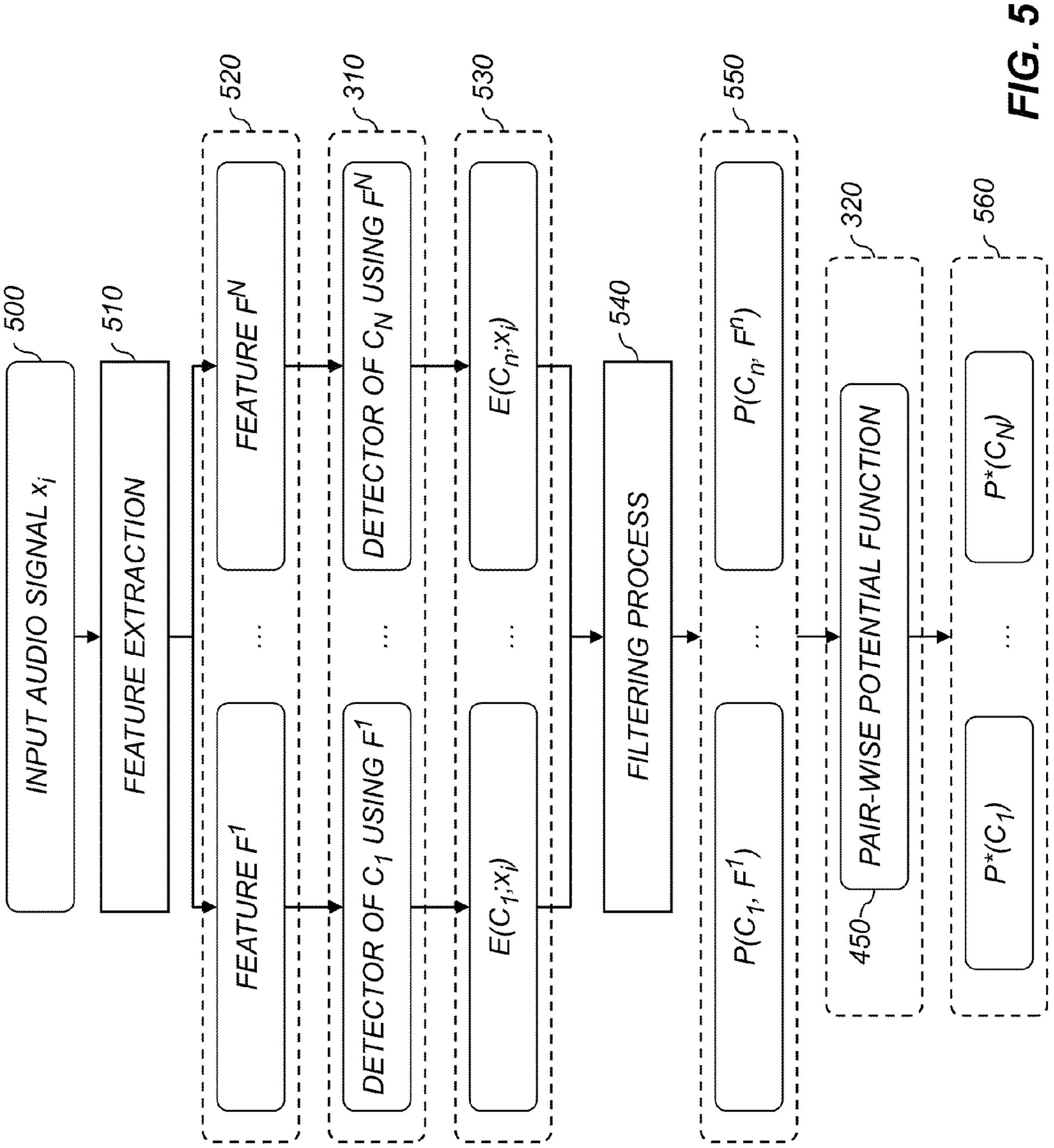
FIG. 5 is a high-level flow diagram illustrating a test process for determining a semantic concept classification for an input audio signal in accordance with the present invention.

FIG. 5 is a high-level flow diagram illustrating a test process for determining a semantic concept classification of an input audio signal 500 ($x_i$) in accordance with a preferred embodiment of the present invention. A feature extraction module 510 is used to automatically analyze the input audio signal 500 to generate a set of audio features 520, corresponding to the set of features 300 selected during the joint training process of FIG. 4.

Next, these audio features 520 are analyzed using the set of independent semantic concept detectors 310 to compute a set of probability estimations 530 ($E(C_j;x_i)$) predicting the probability of occurrence of each semantic concept in the input audio signal.

The probability estimations 530 are further provided to the filtering process 540 to generate preliminary semantic concept detection values 550 $P(C_1,F^1)$, . . . , $P(C_n,F^n)$. Similar to the filtering process 400 discussed relative to the training process of FIG. 4, the filtering process 540 filters out the semantic concepts that have extremely low probabilities of occurrence in the input audio signal 500, based on the probability estimations 530. In a preferred embodiment, the filtering process 540 compares the probability estimations 530 to a predefined threshold and discards any semantic concepts that fall below the threshold. In some embodiments, different thresholds can be defined for different semantic concepts based on a training process.

The set of preliminary semantic concept detection values 550 are applied to the joint likelihood model 320, and through inference with the joint likelihood model 320, a set of updated semantic concept detection values 560 ($P^*(C_j)$) are obtained representing a probability of occurrence for each of the remaining semantic concepts $C_j$ that were not filtered out by the filtering process 540.

As described with respect to FIG. 4, in a preferred embodiment the joint likelihood model 320 has an associated pair-wise potential function 450. To conduct the inference using the joint likelihood model 320, the set of all possible binary assignments over the remaining semantic concepts can be first enumerated. For example, let $C_1$, . . . , $C_n$ denote the remaining semantic concept. Each concept $c_j$ can take on binary assignments (i.e., 0 or 1). There are in total of $2^n$ possible ways of assigning $C_1$, . . . , $C_n$ binary assignments.

For each given assignment I: $C_1=l_1, \ldots, C_n=l_n$, where $l_j=1$ or 0, based on the pair-wise potential functions 450, one preferred embodiment of the current invention computes the following product:

$$T(I) = \prod_{j=i}^{n} P(C_j, F^j) \prod_{j,k=1, j<k}^{n} \Psi_{jk}(C_j = 1_j, C_k = 1_k; x_i) \quad (6)$$

The product values of all possible assignments are then normalized to obtain the final updated semantic concept detection values 560:

$$P*(C_j) = \frac{\sum_{I:c_j=1} T(I)}{\sum_I T(I)} \quad (7)$$

The semantic concept classification method of the present invention has the following advantages. First, the training set for each pair-wise potential function 450 is created using methods such as cross-validation over the entire training set, so the prior over the new pair-wise training set encodes a large amount of useful information. If a semantic concept pair always co-occurs, this will be encoded and will then impact the trained pair-wise potential function 450 accordingly. Similarly, if the semantic concept pair never co-occurs, this too is encoded. In addition, through the filtering process, the biases and reliability of the independent concept detectors are encoded in the pair-wise training set distribution. In this sense, the system learns and utilizes some knowledge about its own reliability. The other important advantage is the ability to switch feature spaces depending on the task at hand. The model chooses the appropriate feature space of the features 300 and the semantic concept detectors 310 over the pair-wise training set, and such choice can vary a lot among different tasks.

Figure 6:
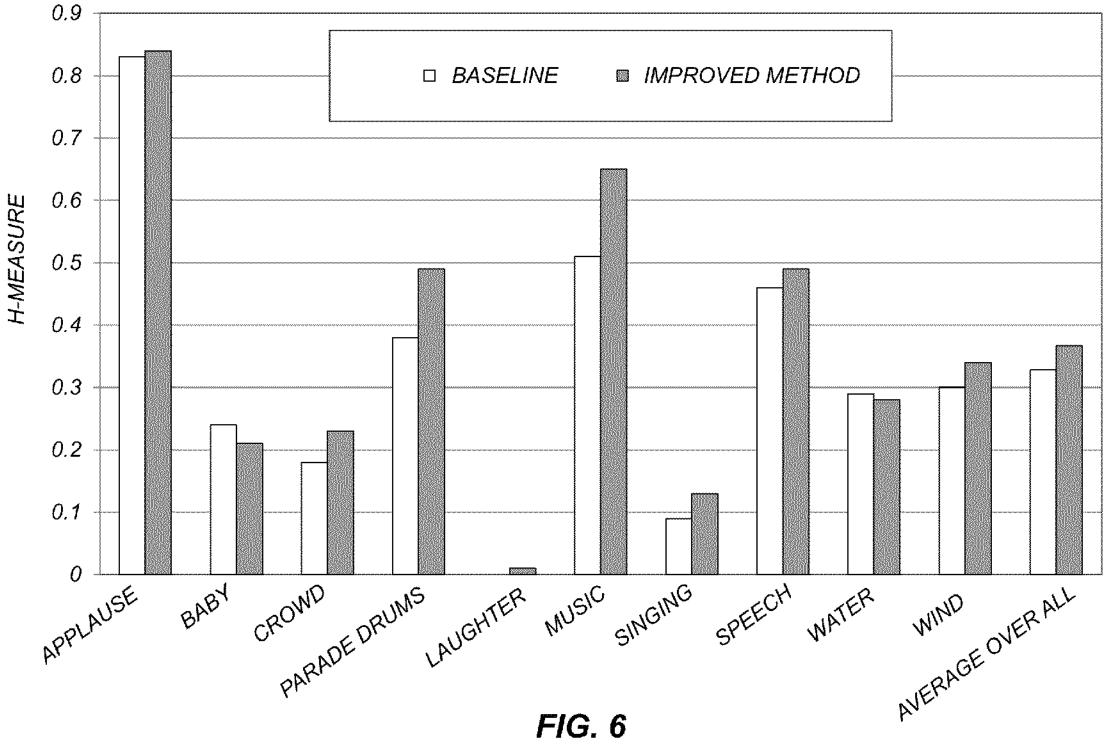
FIG. 6 is a graph comparing the performance of the present invention with a baseline approach.

The above-described audio semantic concept detection method has been tested on a set of over 200 consumer videos. 75% of the videos are taken from an Eastman Kodak internal source. The other 25% of the videos are from the popular online video sharing website YouTube, chosen to augment the incidences of rare concepts in the dataset. Each video was decomposed into five-second video clips, overlapping at intervals of two seconds, resulting in a total of 3715 audio clips. Each frame of the data is labeled positively or negatively for 10 audio concepts. Five possible learning algorithms were evaluated in the selection of the semantic concept detectors 310, including Naive Bayes, Logistic Regression, 10-Nearest Neighbor, Support Vector Machines with RBF Kernels, and Adaboosted decision trees. Each of these types of learning algorithms is well-known in the art. FIG. 6 compares the performance of the improved method provided by the current invention with a baseline classification method that does not incorporate the joint likelihood model. The baseline classifiers train a semantic concept detector using frame-level audio features. Then the frame-level classification scores are averaged together to obtain the clip-level semantic concept scores. It can be seen that the improved method significantly outperforms the baseline classifier.

The semantic concept classification method of the present invention is advantaged over prior methods, such as that described in the aforementioned article by Chang et al. entitled "Large-scale multimodal semantic concept detection for consumer video," in that the signals that are processed by the current invention are strictly audio-based. The method described by Chang et al. detects semantic concepts in video clips using both audio and visual signals. The present invention can be applied to cases where only an audio signal is available. Additionally, even when both audio and video signals may be available, in some cases, the audio signal underlying a video clip may not contain audio sounds (e.g., background sounds or narrations) that are not associated with the video content. For example, the audio signal underlying a "wedding" video clip may contain speech, music, etc, but none of these audio sounds directly corresponds to the classification "wedding." In contrast, the audio signal processed in accordance with the present invention has a definite ground truth based only on the audio content, allowing a more definite assessment of the algorithm's ability to listen.

A further distinction between the present invention and other prior art semantic concept classifiers is that the training process of the present invention jointly learns the independent semantic concept classifiers in the first stage and the joint likelihood model in the second stage, as well as the appropriate set of features that should be used for detecting different semantic concepts. In contrast, the work of Chang et al. uses two disjoint processes to separately learn the independent semantic concept classifiers in the first stage and the joint likelihood model in the second stage. Also, the work of Chang et al. uses the same features for detecting all different semantic concepts.

Figure 7:
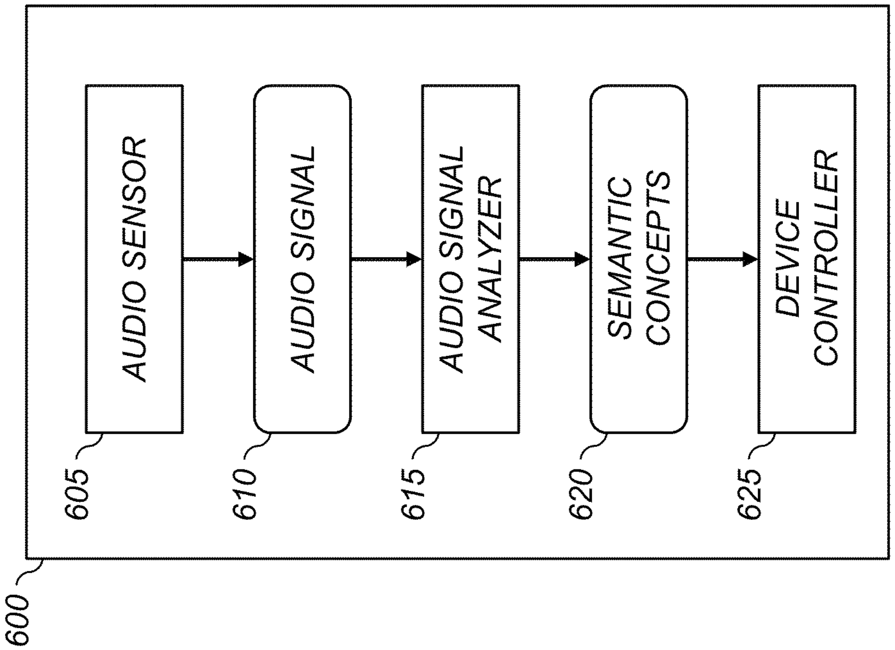
FIG. 7 is a block diagram of a system controlled in response to semantic concepts determined from an audio signal in accordance with the present invention.

The audio signal semantic concept classification method can be used in a wide variety of applications. In some embodiments, the audio signal semantic concept classification method can be used for controlling the behavior of a device. FIG. 7 is a block diagram showing components of a device 600 that is controlled in accordance with the present invention. The device 600 includes an audio sensor 605 (e.g., a microphone) that provides an audio signal 610. An audio signal analyzer 615 receives the audio signal 610 and automatically analyzes it in accordance with the present invention to determine one or more semantic concepts 620 associated with the audio signal 610. In a preferred embodiment, the audio signal analyzer 615 processes the audio signal 610 using the data processing system 110 of FIG. 1 in accordance with the audio signal semantic concept classification method of FIG. 5. The determined semantic concepts 620 are then passed to a device controller 625 that controls one or more aspects of the device 600. The device controller 625 can control the device 600 in various ways. For example, the device controller 625 can adjust device settings associated with the operation of the device, the device controller 625 can cause the device to perform a particular action, or the device controller 625 can disable or enable different available actions. The device 600 will generally include a wide variety of other components such as one or more peripheral systems 120, a user interface system 130 and a data storage system 140 as described in FIG. 1.

The device 600 can be any of a wide variety of types of devices. For example, in some embodiments the device 600 is a digital imaging device such as a digital camera, a smart phone or a video teleconferencing system. In this case, the device controller 625 can control various attributes of the digital imaging device. For example, the digital imaging device can be controlled to capture images in an appropriate photography mode that is selected in accordance with the present invention. The device controller 625 can then control various image capture settings such as lens F/#, exposure time, tone/color processing and noise reduction processes, according to the selected photography mode. The audio signal 610 provided by the audio sensor 605 in the digital imaging device can be analyzed to determine the relevant semantic concepts 620. Appropriate photography modes can be associated with a predefined set of semantic concepts 620, and the photography mode can be selected accordingly.

Examples of photography modes that are commonly used in digital imaging devices would include Portrait, Sports, Landscape, Night and Fireworks. One or more semantic concepts that can be determined from audio signals can be associated with each of these photography modes. For example, the audio signal 610 captured at a sporting event would include a number of characteristic sounds such as crowd noise (e.g., cheering, clapping and background noise), referee whistles, game sounds (e.g., basketball dribbling) and pep band songs. Analyzing the audio signal 610 to detect the co-occurrence of associated semantic concepts (e.g., crowd noise and referee whistle) can provide a high degree of confidence that a Sports photography mode should be selected. Image capture settings of the digital imaging device can be controlled accordingly.

In some embodiments, the digital imaging device is used to capture digital still images. In this case, the audio signal 610 can be sensed and analyzed during the time that the photographer is composing the photograph. In other embodiments, the digital imaging device is used to capture digital videos. In this case, the audio signal 610 can be the audio track of the captured digital video, and the photography mode can be adjusted in real time during the video capture process.

In other exemplary embodiments the device 600 can be a printing device (e.g., an offset press, an electrophotographic printer or an inkjet printer) that produces printed images on a web of receiver media. The printing device can include audio sensor 605 that senses an audio signal 610 during the operation of the printer. The audio signal analyzer 615 can analyze the audio signal 610 to determine associated semantic concepts 620 such as a motor sound, a web-breaking sound and voices. The co-occurrence of a motor sound and a web-breaking sound can provide a high degree of confidence that a web-breakage has occurred. The device controller 625 can then automatically perform appropriate actions such as initiating an emergency stop process. This can include shutting down various printer components (e.g., the motors that are feeding the web of receiver media) and sounding a warning alarm to alert the system operator. On the other hand, if the semantic concept detectors 310 (FIG. 5) detect a web-breaking sound but don't detect a motor sound, then the joint likelihood model 320 (FIG. 5) would determine that it is unlikely that a web-breaking semantic concept is appropriate.

In other exemplary embodiments the device 600 can be a scanning device (e.g., a document scanner with an automatic document feeder) that scans images on various kinds of input hardcopy media. The scanning device can include audio sensor 605 that senses an audio signal 610 during the operation of the scanning device. The audio signal analyzer 615 can analyze the audio signal 610 to determine associated semantic concepts 620 such as a motor sound, feed error sounds (e.g., a paper wrinkling sound) and voices. For example, the co-occurrence of a motor sound and a paper-wrinkling sound can provide a high degree of confidence that a feed error has occurred. The device controller 625 can then automatically perform appropriate actions such as initiating an emergency stop process. This can include shutting down various scanning device components (e.g., the motors that are feeding the media) and displaying appropriate error messages can on a user interface instructing the user to clear the paper jam. On the other hand, if the semantic concept detectors 310 (FIG. 5) detect a paper wrinkling sound but don't detect a motor sound, then the joint likelihood model 320 (FIG. 5) would determine that it is unlikely that a feed error semantic concept is appropriate.

In other exemplary embodiments the device 600 can be a hand-held electronic device (e.g., a cell phone, a tablet computer or an e-book reader). The operation of such devices by a driver operating a motor vehicle is known to be dangerous. If an audio signal 610 is analyzed to determine that a driving semantic concept has a high-likelihood, then the device controller 625 can control the hand-held electronic device such that the operation of appropriate device functions (e.g., texting) can be disabled. Similarly, other device functions (e.g., providing a custom message to persons calling the cell-phone indicating that the owner of the device is unavailable) can be enabled. In some embodiments, the device functions are disabled or enabled by adjusting user interface elements provided on a user interface of the hand-held electronic device.

It will be obvious to one skilled in the art that the method of the present invention can similarly be used to control a wide variety of other types of devices 600, where various device settings can be associated with audio signal attributes pertaining to the operation of the device, or with the environment in which the device is being operated.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

110 data processing system
120 peripheral system
130 user interface system
140 data storage system
200 training audio signals
210 feature extraction module
220 audio features
230 train independent semantic concept detectors module
240 concept detectors
250 preliminary semantic concept detection values
260 train joint likelihood model module
270 semantic concept detectors
300 features
310 semantic concept detectors
320 joint likelihood model
400 filtering process
405 predefined threshold
410 filtered semantic concept detection values
415 training labels
420 training sets
430 learning algorithms
435 performance assessment function
440 determined learning algorithms
450 pair-wise potential function
500 input audio signal
510 feature extraction module

520 audio features
530 probability estimations
540 filtering process
550 preliminary semantic concept detection values
560 updated semantic concept detection values
600 device
605 audio sensor
610 audio signal
615 audio signal analyzer
620 semantic concepts
625 device controller

The invention claimed is:

1. A method for determining a semantic concept associated with an audio signal captured using an audio sensor, comprising:

receiving the audio signal from the audio sensor;

using a data processor to automatically analyze the audio signal using a plurality of semantic concept detectors to determine corresponding preliminary semantic concept detection values, the semantic concept detectors being associated with a corresponding plurality of semantic concepts, each semantic concept detector being adapted to detect a particular semantic concept;

using a data processor to automatically analyze the preliminary semantic concept detection values using a joint likelihood model to determine updated semantic concept detection values; wherein the joint likelihood model determines the updated semantic concept detection values based on predetermined pair-wise likelihoods that particular pairs of semantic concepts co-occur;

identifying one or more semantic concept associated with the audio signal based on the updated semantic concept detection values; and storing an indication of the identified semantic concepts in a processor-accessible memory;

wherein the semantic concept detectors and the joint likelihood model are trained together with a joint training process using training audio signals, at least some of which are known to be associated with a plurality of semantic concepts, and wherein each of the semantic concept detectors determines the preliminary semantic concept detection values responsive to an associated set of audio features, the audio features being determined by analyzing the audio signal.

2. The method of claim 1 wherein the particular audio features associated with each semantic concept detector are determined during the joint training process.

3. The method of claim 1 wherein the audio signal is subdivided into a set of audio frames, and wherein the audio frames are analyzed to determine frame-level audio features.

4. The method of claim 3 wherein the frame-level audio features from a plurality of audio frames are aggregated to determine clip-level features.

5. The method of claim 4 wherein the frame-level audio features are aggregated by computing frame-level preliminary semantic concept detection values responsive to the frame-level audio features and then determining clip-level preliminary semantic concept detection values by determining an average or a maximum of the frame-level preliminary semantic concept detection values.

6. The method of claim 1 wherein the semantic concept detectors are Nearest Neighbor classifiers, Support Vector Machine classifiers or decision tree classifiers.

7. The method of claim 1 wherein the joint likelihood model is a Markov Random Field model having a set of nodes connected by edges, wherein each node corresponds to a particular semantic concept, and the edge connecting a pair of nodes corresponds to a pair-wise potential function between the corresponding pair of semantic concepts providing an indication of the pair-wise likelihood that the pair of semantic concepts co-occur.

8. The method of claim 1 further including applying a filtering process to discard any semantic concept having a preliminary semantic concept detection value below a predefined threshold.

9. The method of claim 1 wherein the joint training process determines the semantic concept detectors and the joint likelihood model that maximize a predefined performance assessment function.

10. A method for determining a semantic concept associated with an audio signal captured using an audio sensor, comprising:

receiving the audio signal from the audio sensor;

using a data processor to automatically analyze the audio signal using a plurality of semantic concept detectors to determine corresponding preliminary semantic concept detection values, the semantic concept detectors being associated with a corresponding plurality of semantic concepts, each semantic concept detector being adapted to detect a particular semantic concept;

using a data processor to automatically analyze the preliminary semantic concept detection values using a joint likelihood model to determine updated semantic concept detection values; wherein the joint likelihood model determines the updated semantic concept detection values based on predetermined pair-wise likelihoods that particular pairs of semantic concepts co-occur;

identifying one or more semantic concept associated with the audio signal based on the updated semantic concept detection values; and storing an indication of the identified semantic concepts in a processor-accessible memory;

wherein the semantic concept detectors and the joint likelihood model are trained together with a joint training process using training audio signals, at least some of which are known to be associated with a plurality of semantic concepts, and wherein the semantic concept detectors are Nearest Neighbor classifiers, Support Vector Machine classifiers or decision tree classifiers.

11. A method for determining a semantic concept associated with an audio signal captured using an audio sensor, comprising:

receiving the audio signal from the audio sensor;

using a data processor to automatically analyze the audio signal using a plurality of semantic concept detectors to determine corresponding preliminary semantic concept detection values, the semantic concept detectors being associated with a corresponding plurality of semantic concepts, each semantic concept detector being adapted to detect a particular semantic concept;

using a data processor to automatically analyze the preliminary semantic concept detection values using a joint likelihood model to determine updated semantic concept detection values; wherein the joint likelihood model determines the updated semantic concept detection values based on predetermined pair-wise likelihoods that particular pairs of semantic concepts co-occur;

identifying one or more semantic concept associated with the audio signal based on the updated semantic concept detection values; and storing an indication of the identified semantic concepts in a processor-accessible memory;

wherein the semantic concept detectors and the joint likelihood model are trained together with a joint training process using training audio signals, at least some of which are known to be associated with a plurality of semantic concepts, and wherein the joint likelihood model is a Markov Random Field model having a set of nodes connected by edges, wherein each node corresponds to a particular semantic concept, and the edge connecting a pair of nodes corresponds to a pair-wise potential function between the corresponding pair of semantic concepts providing an indication of the pair-wise likelihood that the pair of semantic concepts co-occur.

12. A method for determining a semantic concept associated with an audio signal captured using an audio sensor, comprising:

receiving the audio signal from the audio sensor;

using a data processor to automatically analyze the audio signal using a plurality of semantic concept detectors to determine corresponding preliminary semantic concept detection values, the semantic concept detectors being associated with a corresponding plurality of semantic concepts, each semantic concept detector being adapted to detect a particular semantic concept;

using a data processor to automatically analyze the preliminary semantic concept detection values using a joint likelihood model to determine updated semantic concept detection values; wherein the joint likelihood model determines the updated semantic concept detection values based on predetermined pair-wise likelihoods that particular pairs of semantic concepts co-occur;

identifying one or more semantic concept associated with the audio signal based on the updated semantic concept detection values;

storing an indication of the identified semantic concepts in a processor-accessible memory; and applying a filtering process to discard any semantic concept having a preliminary semantic concept detection value below a predefined threshold;

wherein the semantic concept detectors and the joint likelihood model are trained together with a joint training process using training audio signals, at least some of which are known to be associated with a plurality of semantic concepts.

13. A method for determining a semantic concept associated with an audio signal captured using an audio sensor, comprising:

receiving the audio signal from the audio sensor;

using a data processor to automatically analyze the audio signal using a plurality of semantic concept detectors to determine corresponding preliminary semantic concept detection values, the semantic concept detectors being associated with a corresponding plurality of semantic concepts, each semantic concept detector being adapted to detect a particular semantic concept;

using a data processor to automatically analyze the preliminary semantic concept detection values using a joint likelihood model to determine updated semantic concept detection values; wherein the joint likelihood model determines the updated semantic concept detection values based on predetermined pair-wise likelihoods that particular pairs of semantic concepts co-occur;

identifying one or more semantic concept associated with the audio signal based on the updated semantic concept detection values; and storing an indication of the identified semantic concepts in a processor-accessible memory;

wherein the semantic concept detectors and the joint likelihood model are trained together with a joint training process using training audio signals, at least some of which are known to be associated with a plurality of semantic concepts, and wherein the joint training process determines the semantic concept detectors and the joint likelihood model that maximize a predefined performance assessment function.

* * * * *